(12) United States Patent
Kawakami et al.

(10) Patent No.: US 6,953,564 B2
(45) Date of Patent: Oct. 11, 2005

(54) METHOD FOR PRODUCING FULLERENES

(75) Inventors: Soichiro Kawakami, Nara (JP); Tomoya Yamamoto, Fukui (JP); Hitomi Sano, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 567 days.

(21) Appl. No.: 10/260,556

(22) Filed: Oct. 1, 2002

(65) Prior Publication Data
US 2003/0072706 A1    Apr. 17, 2003

(30) Foreign Application Priority Data

Oct. 4, 2001 (JP) ............................. 2001-309272
Sep. 27, 2002 (JP) ............................. 2002-282299

(51) Int. Cl.⁷ .............................................. D01F 9/12
(52) U.S. Cl. ............................. 423/447.3; 423/447.1; 423/445 B
(58) Field of Search .................. 423/447.1, 447.3, 423/445 B

(56) References Cited

U.S. PATENT DOCUMENTS

| 6,455,021 B1 | 9/2002 | Saito .................. 423/447.3 |
| 2002/0102193 A1 | 8/2002 | Smalley et al. ............. 422/190 |
| 2002/0102194 A1 | 8/2002 | Smalley et al. ............. 422/190 |
| 2002/0102203 A1 | 8/2002 | Smalley et al. .......... 423/447.3 |
| 2003/0086859 A1 | 5/2003 | Kawakami et al. ....... 423/447.1 |

FOREIGN PATENT DOCUMENTS

| JP | 5-186865 | 7/1993 |
| JP | 6-32606 | 2/1994 |
| JP | 6-56414 | 3/1994 |
| JP | 6-157016 | 6/1994 |
| JP | 7-215710 | 8/1995 |
| JP | 9-188509 | 7/1997 |
| JP | 2000-86217 | 3/2000 |
| JP | 2000-95509 | 4/2000 |
| WO | WO 95/06001 | 3/1995 |
| WO | WO 02/060813 A2 | 8/2002 |

OTHER PUBLICATIONS

U.S. Appl. No. 10/807,104, filed Mar. 24, 2004, Kawakami et al.

Yury G. Gogotsi et al., "Formation of Filamentous Carbon from Paraformaldehyde Under High Temperatures and Pressures," 36(7-8) *Carbon* 937-942 (1998).

Yury G. Gogotsi et al., "Hydrothermal Synthesis of Multiwall Carbon Nanotubes," 15(12) *J. Mater. Res.* 2591-2594 (Dec. 2000).

(Continued)

*Primary Examiner*—Stuart Hendrickson
*Assistant Examiner*—Rebecca M. Stadler
(74) *Attorney, Agent, or Firm*—Fitzpatrick, Cella, Harper & Scinto

(57) ABSTRACT

A method for producing fullerenes, characterized in that said method includes a step (a) of contacting an aromatic compound-containing starting material with a supercritical fluid or a subcritical fluid at a temperature in a range of from 31° C. to 500° C. and at a pressure in a range of from 3.8 MPa to 60 MPa. Said supercritical fluid or said subcritical fluid is formed from one or more kinds of materials selected from the group consisting of an aromatic compound as said starting material, a solvent capable of dissolving said aromatic compound, water, dinitrogen monoxide, and ammonia.

15 Claims, 2 Drawing Sheets

OTHER PUBLICATIONS

Jose Maria Calderon Moreno et al., "Hydrothermal Processing of High-Quality Multiwall Nanotubes from Amorphous Carbon," 123 *J. Am. Chem. Soc.* 741-742 (2001).

Pratibhash Chattopadhyay et al., "Supercritical $CO_2$-Based Production of Fullerene Nanoparticles," 39 *Ind. Eng. Chem. Res.* 2281-89 (2000).

H.M. Cheng et al., "Large-Scale and Low-Cost Synthesis of Single-Walled Carbon Nanotubes by the Catalytic Pyrolysis of Hydrocarbons," 72(25) *Appl. Phys. Lett.* 3282-84 (Jun. 1998).

Bipin Kumar Gupta et al., "Synthesis and Hydrogenation Behaviour of Graphitic Nanofibers," 25 *International Journal of Hydrogen Energy* 825-30 (2000).

METHOD FOR PRODUCING FULLERENES

BACKGROUND OF THE INVENTION

1. Field of the Invention

The present invention relates to a method for producing fullerenes. More particularly, the present invention relates to a method which enables one to mass-produce fullerenes from relatively inexpensive raw material.

2. Related Background Art

Since the discovery of fullerene $C_{60}$ having a soccer ball-like polyhedral molecular structure comprising 60 carbon atoms by H. W. Kroto, R. E. Smallry and R. F. Curl, fullerene $C_{70}$ with 70 carbon atoms, fullerene $C_{76}$ with 76 carbon atoms, fullerene $C_{78}$ with 78 carbon atoms, fullerene $C_{82}$ with 82 carbon atoms, fullerene $C_{84}$ with 84 carbon atoms, fullerene $C_{86}$ with 86 carbon atoms, fullerene $C_{88}$ with 88 carbon atoms, fullerene $C_{90}$ with 90 carbon atoms, fullerene $C_{94}$ with 94 carbon atoms, and fullerene $C_{96}$ with 96 carbon atoms respectively having a soccer ball-like polyhedral molecular structure have been successively discovered. Besides, fullerenes containing metal elements therein have been also discovered. Along with the discovery of these fullerenes, various researches on their application use in functional devices and medicaments have been vigorously carrying out.

As the method of producing such fullerenes, there have been developed various methods such as a laser evaporation in heated flow gas method wherein fullerenes are extracted from a soot-like material produced by radiating a laser to a graphite in an argon or helium gas stream heated to high temperature of about 1200° C.; a resistive heating method wherein fullerenes are extracted from a soot-like material produced by energizing a graphite rod to heat the graphite rod in a helium gas atmosphere; an arc-discharge method wherein fullerenes are extracted from a carbon medium produced by generating arc-discharge between two graphite electrodes; a high frequency induction heating method wherein fullerenes are extracted from extracted from a soot-like material produced by heating and evaporating a graphite by flowing overcurrent therein by way of high frequency induction; and a burning method wherein fullerenes are extracted from a soot-like material produced by burning a mixed gas comprising benzene and oxygen which is diluted with argon gas.

Besides, Japanese Laid-open Patent Publication No. 5(1993)-186865 discloses a method for producing carbon clusters by subjecting a pair of electrodes comprising a carbon rod and a metal rod arranged in a vessel filled with inert gas to arc-discharging or resistive heating. Japanese Laid-open Patent Publication No. 6(1994)-56414 and Japanese Laid-open Patent Publication No.6(1994)-32606 disclose a method for producing fullerenes by isolating them from a solid material produced by supplying an aromatic compound in a heat plasma generated.

However, any of the above-mentioned methods for producing fullerenes has disadvantages such that the starting material and the apparatus used for practicing the method are costly, the yield is low, and it is difficult to quantitatively produce fullerenes at a reasonable production cost.

SUMMARY OF THE INVENTION

The present invention has been accomplished in view of the circumstances in the prior art for the production of fullerenes.

The present invention makes it an object to provide a method which enables one to quantitatively produce fullerenes, which are capable of being applied in various functional devices and medicaments, from relatively inexpensive raw material by a simple manner using a relatively inexpensive apparatus.

The fullerenes produced in the present invention include various fullerenes whose number of carbon atoms being different one from the other, including fullerenes whose carbon atoms are partly modified by other chemical bonds with metal atoms to contain fullerene derivative metal atoms, and fullerenes whose carbon atoms are partly substituted with nitrogen atoms, boron atoms or silicon atoms.

The method for producing fullerenes of the present invention is characterized in that said method includes a step of contacting an aromatic compound-containing starting material with a supercritical fluid or a subcritical fluid. In a typical embodiment, the starting material is contacted with the supercritical fluid or the subcritical fluid at a temperature preferably in a range of from 31° C. to 500° C. or more preferably in a range of from 250° C. to 500° C. In this case, it is preferred that the contact of the starting material with the supercritical fluid or the subcritical fluid is conducted under pressure condition of 3.8 MPa to 60 MPa.

The supercritical fluid means a fluid having liquid properties and gaseous properties and which is in a state with a temperature and a pressure respectively exceeding the critical point (the critical temperature and the critical pressure) where gas and liquid can together exist. The subcritical fluid means a fluid following the supercritical fluid. Specifically, when the above critical temperature is made to be $T_0$ (absolute temperature) and the above critical pressure is made to be $P_0$ (MPa), the subcritical fluid means a fluid which is in a state with an absolute temperature T and a pressure P which satisfy the following equations.

$$T \geq 0.8 T_0$$

$$P \geq 0.8 P_0$$

The supercritical fluid or the subcritical fluid is formed from one or more materials selected from the group consisting of an aromatic compound as the starting material, a solvent for said aromatic compound, water, dinitrogen monoxide, and ammonia. Said solvent is preferred to comprise a solvent which can dissolve more than 2 mole % of a solute (that is, said aromatic compound) at a temperature of 20° C. under pressure of 0.1013 MPa. As preferable specific examples, there can be illustrated carbon dioxide, alcohols, hydrocarbons and ethers. These solvents may be used either singly or in combination of two or more of them.

The aromatic compound-containing starting material can include benzene, toluene, xylene, pitch, pitch coke, petroleum coke, coal tar, fluoranthene, pyrene, chrysene, phenanthrene, anthracene, naphthalene, methylnaphthalene, fluorene, biphenyl, and acenaphthene. These materials may be used either singly or in combination of two or more of them.

In the fullerene-producing method of the present invention, when the starting material is contacted with the supercritical fluid or the subcritical fluid, there is afforded a reaction product containing fullerenes. The method of the present invention further includes a step of subjecting the reaction product to a heat treatment at a temperature in a range of from 300 to 600° C., in order to remove impurities contained in the reaction product. The heat treatment is preferred to be conducted in a gas atmosphere composed of one or more gases selected from the group consisting of argon gas, helium gas and nitrogen gas.

The heat-treated reaction product contains fullerenes. The method of the present invention still further includes a step of extracting a solvent-dissoluble component containing fullerenes from the heat-treated reaction product by dissolving the dissoluble component contained in the heat-treated reaction product in a solvent capable of dissolving fullerenes.

In the fullerene-producing method of the present invention, it is possible that to contact the starting material with the supercritical fluid or the subcritical fluid is performed in the presence of a transition metal or/and a transition metal compound.

The transition metal element constituting the transition metal or the transition metal compound can include Ti, V, Cr, Mn, Fe, Co, Ni, Cu, Y, Zr, Nb, Mo, Ru, Pd, Ag, Ta, W, Pt, and Au.

The transition metal compound can include transition metal halides, transition metal sulfides, transition metal carbides, organo transition metal compounds, transition metal nitrides, and transition metal oxides. These transition metal compounds may be used either singly or in combination of two or more of them.

The fullerene-producing method of the present invention is preferred to include a purification step in that the fullerenes-containing product obtained is purified. Specifically, in the case where the fullerenes contained in the reaction product obtained when the aromatic compound-containing starting material is contacted with the supercritical fluid or the subcritical fluid contain a magnetic metal element therein, the magnetic metal element-containing fullerenes are collected by means of a magnet, whereby it is possible to obtain a purified fullerenes-containing product.

DETAILED DESCRIPTION OF THE INVENTION AND PREFERRED EMBODIMENTS

Figure 1:
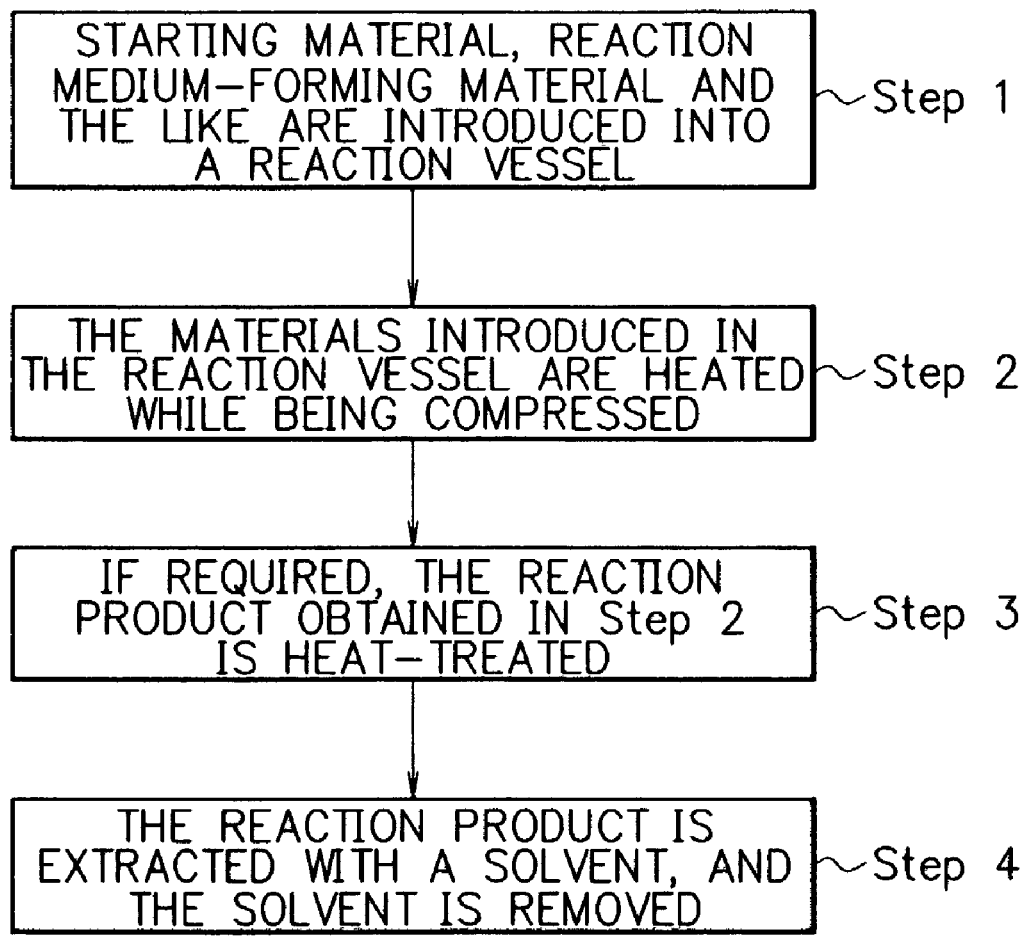
FIG. 1 shows a flow chart illustrating an example of the method for producing fullerenes according to the present invention.

As previously described, the present invention provides a method which enables one to quantitatively produce fullerenes, characterized in that said method includes a step of contacting an aromatic compound-containing starting material with a supercritical fluid or a subcritical fluid.

As previously described, said supercritical fluid or said subcritical fluid is formed from a prescribed raw material. However, such raw material is not always necessary to be added in the case where said starting material comprises an aromatic compound-containing material which can be converted into a supercritical fluid or a subcritical fluid at a prescribed temperature and at a prescribed reaction pressure which are adopted in the method of the present invention.

As previously described, the fullerenes produced in the present invention include various fullerenes whose number of carbon atoms being different one from the other, including fullerenes whose carbon atoms are partly modified by other chemical bonds with metal atoms to contain fullerene derivative metal atoms, and fullerenes whose carbon atoms are partly substituted with nitrogen atoms, boron atoms or silicon atoms.

As the aromatic compound-containing starting material used in the present invention, any aromatic compound-containing materials capable of producing fullerenes and which can be acquired at a reasonable cost can be selectively used.

As specific examples of such aromatic compound-containing material, there can be illustrated benzene, toluene, xylene, pitch, pitch coke, petroleum coke, coal tar, fluoranthene, pyrene, chrysene, phenanthrene, anthracene, naphthalene, methylnaphthalene, fluorene, biphenyl, and acenaphthene. These materials may be used either singly or in combination of two or more of them.

Of the above-mentioned materials, pitch, pitch coke, petroleum coke, and coal tar are preferred because they can be easily acquired at a relatively inexpensive cost.

As previously described, the supercritical fluid used in the present invention means a fluid having liquid properties and gaseous properties and which is in a state with a temperature and a pressure respectively exceeding the critical point (the critical temperature and the critical pressure) where gas and liquid can together exist. And the subcritical fluid used in the present invention means a fluid following the supercritical fluid. Specifically, when the above critical temperature is made to be $T_0$ (absolute temperature) and the above critical pressure is made to be $P_0$ (MPa), the subcritical fluid means a fluid which is in a state with an absolute temperature T and a pressure P which satisfy the following equations.

$$T \geq 0.8 T_0$$

$$P \geq 0.8 P_0$$

To contact the aromatic compound-containing starting material with the supercritical fluid or the subcritical fluid in the present invention may be conducted, for instance, in the following manner. The aromatic compound-containing starting material and a raw material for forming the supercritical fluid or the subcritical fluid are introduced into a substantially enclosed reaction vessel, and the starting material and the raw material are together heated at a prescribed temperature while being compressed at a prescribed pressure in the reaction vessel, where the raw material in a mixed state with the starting material is converted into a supercritical fluid or a subcritical fluid and the starting material is contacted and reacted with the resulting supercritical fluid or the resulting subcritical fluid to afford a reaction product containing fullerenes.

The heating temperature and the compressing pressure in this case are different depending upon the kind of the raw material used for forming the supercritical fluid or the subcritical fluid. However, in general, it is preferred that the heating temperature is preferably in a range of from 31° C. to 500° C. or more preferably in a range of from 250° C. to 500° C. and the compressing pressure is in a range of from 3.8 MPa to 60 MPa, from the viewpoint of the condition under which fullerenes are produced and also from the viewpoints of diminishing the cost of the apparatus used and saving the operation energy.

It is presumed that the supercritical fluid or the subcritical fluid functions as a reaction medium to form fullerenes from the aromatic compound-containing starting material. Particularly, the supercritical fluid has an excellent solvent function and promotes the formation of fullerenes from the aromatic compound-containing starting material. Therefore, it is preferred that the aromatic compound-containing starting material is contacted with the supercritical fluid, wherein it is preferred that the foregoing heating temperature and the foregoing compressing pressure respectively exceed the critical temperature and the critical pressure of the supercritical fluid.

The raw material which is converted into the supercritical fluid or the subcritical fluid to form the reaction medium (this raw material will be hereinafter referred to as "reaction medium-forming material") comprises a material capable of being converted into a supercritical fluid or a subcritical fluid at a temperature preferably in a range of from 31° C. to 500° C. or more preferably in a range of from 250° C. to 500° C. and at a pressure in a range of from 3.8 MPa to 60 MPa.

Such material as the reaction medium-forming material can include an aromatic compound as the starting material, a solvent for said aromatic compound, water, dinitrogen monoxide, and ammonia. These materials may be used either singly or in combination of two or more of them as a mixture.

Said solvent for said aromatic compound is preferred to comprises a solvent which can dissolve more than 2 mole % of a solute (that is, said aromatic compound) at a temperature of 20° C. under pressure of 0.1013 MPa.

As preferable specific examples of such solvent, there can be illustrated carbon dioxide, alcohols, hydrocarbons and ethers. These solvents may be used either singly or in combination of two or more of them. As specific examples of said alcohol, there can be illustrated methanol, ethanol, and propyl alcohol. As specific examples of said hydrocarbon, there can be illustrated methane, ethane, ethylene, propane, propylene, butane, butene, pentane, and hexane.

Of the above-mentioned materials as the reaction medium-forming material, carbon dioxide and water are preferable.

The critical temperature and the critical pressure at which carbon dioxide is converted into a supercritical fluid are respectively 31° C. and 7.38 MPa. The critical temperature and the critical pressure at which water is converted into a supercritical fluid are respectively 374° C. and 22.0 MPa. Separately, the critical temperature and the critical pressure at which toluene is converted into a supercritical fluid are respectively 319° C. and 4.11 MPa. And the critical temperature and the critical pressure at which naphthalene is converted into a supercritical fluid are respectively 475° C. and 4.11 MPa.

The fullerene-producing method of the present invention is preferred to include a heat-treating step.

In the heat-treating step, the reaction product obtained when the aromatic compound-containing starting material is contacted with the supercritical fluid or the subcritical fluid is subjected to a heat treatment to remove impurities including unreacted material contained in the reaction product. This heat-treating step serves to improve the purity of fullerenes.

It is preferred that the above heat treatment is conducted at a temperature less than the temperature at which fullerenes are disappeared. Such temperature is preferably in a range of from 300° C. to 600° C. or more preferably in a range of from 300° C. to 400° C. Further, the above heat treatment is preferred to be conducted in a gas atmosphere composed of inert gas. The inert gas can include argon gas, helium gas and nitrogen gas. These gases may be used either singly or in combination of two or more of them as a mixed gas. The heat treatment may be conducted in a step-wise manner. To be more specific, it is possible that the heat treatment is repeated several times by changing the heat-treating temperature.

The fullerene-producing method of the present invention is preferred to further include a solvent-treating step in that the resultant heat-treated reaction product obtained in the above heat-treating step is dispersed in a solvent for fullerenes therein to dissolve the dissoluble component contained in the heat-treated reaction product in the solvent, where the dissoluble component dissolved in the solvent contains fullerenes, and the solvent is subjected to an extraction treatment to extract said component in the form of a solid component.

By conducting this solvent-treating step, the purity of the fullerenes-containing product obtained is improved.

At the time when the heat-treated reaction product is dispersed in the solvent, it is possible to irradiate ultrasonic wave in order to promote the dissolution of the fullerenes in the solvent.

As the above solvent in which the heat-treated reaction product is dispersed, it is preferred to use a nonpolar solvent.

As specific examples of the nonpolar solvent, there can be illustrated toluene, xylene, benzene, chlorobenzene, dichlorobenzene, 1,2,4-trichlorobenzene, 1-methylnaphthalene, 1-chloronaphthalene, tetralin, anisole, 1,1,2,2-tetrachloroethane, decalin, 2-methylthiophene, carbon disulfide, and cyclohexene. These nonpolar solvents may be used either singly or in combination two or more of them as a mixed solvent.

In the present invention, it is possible that the reaction product obtained when the aromatic compound-containing starting material is contacted with the supercritical fluid or the subcritical fluid is subjected to the above solvent-treating step without being heat-treated by the heat-treating step. In this case, the reaction product is dispersed in the above solvent to dissolve the dissoluble component contained in the reaction product in the solvent, where the dissoluble component dissolved in the solvent contains fullerenes, and the solvent is subjected to an extraction treatment to extract said component in the form of a solid component.

The isolation of the solid component resulted in the solvent-treating step may be conducted by subjecting the solvent containing the solid component to filtration or centrifugation. To remove the residual solvent in the isolated solid component may be conducted by subjecting the isolated solid component to a heat treatment or by subjecting the isolated solid component to an evaporation treatment under reduced pressure. It is possible to use high performance liquid chromatography in this isolation and purification.

In the present invention, to contact the aromatic compound-containing starting material with the supercritical fluid or the subcritical fluid may be performed in the presence of a transition metal or/and a transition metal compound, because this will occasionally improve the yield of fullerenes. Particularly, the intervention of the transition metal or/and the transition metal compound serves to promote the formation of fullerenes depending on the kind of the aromatic compound-containing starting material used or/and the kind of the reaction medium-forming material used. In this case, it is presumed that the transition metal or the transition metal compound behaves like a catalyst.

The transition metal or the transition metal compound is introduced into the reaction vessel together with the aromatic compound-containing starting material and the raw material for forming the supercritical fluid or the subcritical fluid. And when the raw material is converted into the supercritical fluid or the subcritical fluid as previously described, the transition metal or the transition metal compound is present in contact with the starting material and the supercritical fluid or the subcritical fluid.

As the transition metal or the transition metal compound, it is preferred to use one which functions as an effective catalyst in dehydrogenation reaction. The transition metal or the transition metal compound is not always necessary to be externally added. The transition metal or the transition metal compound may be one originally contained in the starting material or one resulted when the starting material is contacted with the supercritical fluid or the subcritical fluid.

The transition metal element constituting the transition metal or the transition metal compound can include Ti, V, Cr, Mn, Fe, Co, Ni, Cu, Y, Zr, Nb, Mo, Ru, Pd, Ag, Ta, W, Pt, and Au. Of these, Ni, Co, Fe, Cu, Cr, W, Mo, Ti, V, and Mn are more preferred, and Ni, Co, Fe, Cu, Cr, W, Mo, and Ti are most preferred.

The transition metal compound can include transition metal halides, transition metal sulfides, transition metal carbides, organo transition metal compounds, transition metal nitrides, and transition metal oxides.

These transition metal compounds may be used either singly or in combination of two or more of them.

As specific preferable examples of the transition metal carbide, there can be illustrated tungsten carbide, molybdenum carbide, and titanium carbide.

As specific preferable examples of the organo transition metal compound, there can be illustrated ferrocene, nickelocene, nickel phthalocyanine, cobalt phthalocyanine, copper phthalocyanine, nickel acetylacetonato, cobalt acetylacetonato, iron acetylacetonato, copper acetylacetonato, nickel carbonyl, cobalt carbonyl, iron carbonyl, bis(triphenylphosphine)dicarbonylnickel, dibromobis(triphenylphosphine)nickel, and chlorotris(triphenylphosphine)rodium.

In the present invention, in the case where the fullerenes contained in the reaction product obtained when the aromatic compound-containing starting material is contacted with the supercritical fluid or the subcritical fluid contain a magnetic metal element therein, the magnetic metal element-containing fullerenes are collected by means of a magnet (a permanent magnet or an electromagnet), whereby it is possible to obtain a purified fullerenes-containing product. To be more specific, said reaction product is dispersed in a dispersion medium such as alcohol or water while irradiating ultrasonic wave, and thereafter, the magnetic metal element-containing fullerenes are collected by means of a permanent magnet or an electromagnet, whereby it is possible to obtain a purified fullerenes-containing product. This purification treatment may be conducted at the stage before or after the heat-treating step or after the solvent-treating step.

Figure 2:
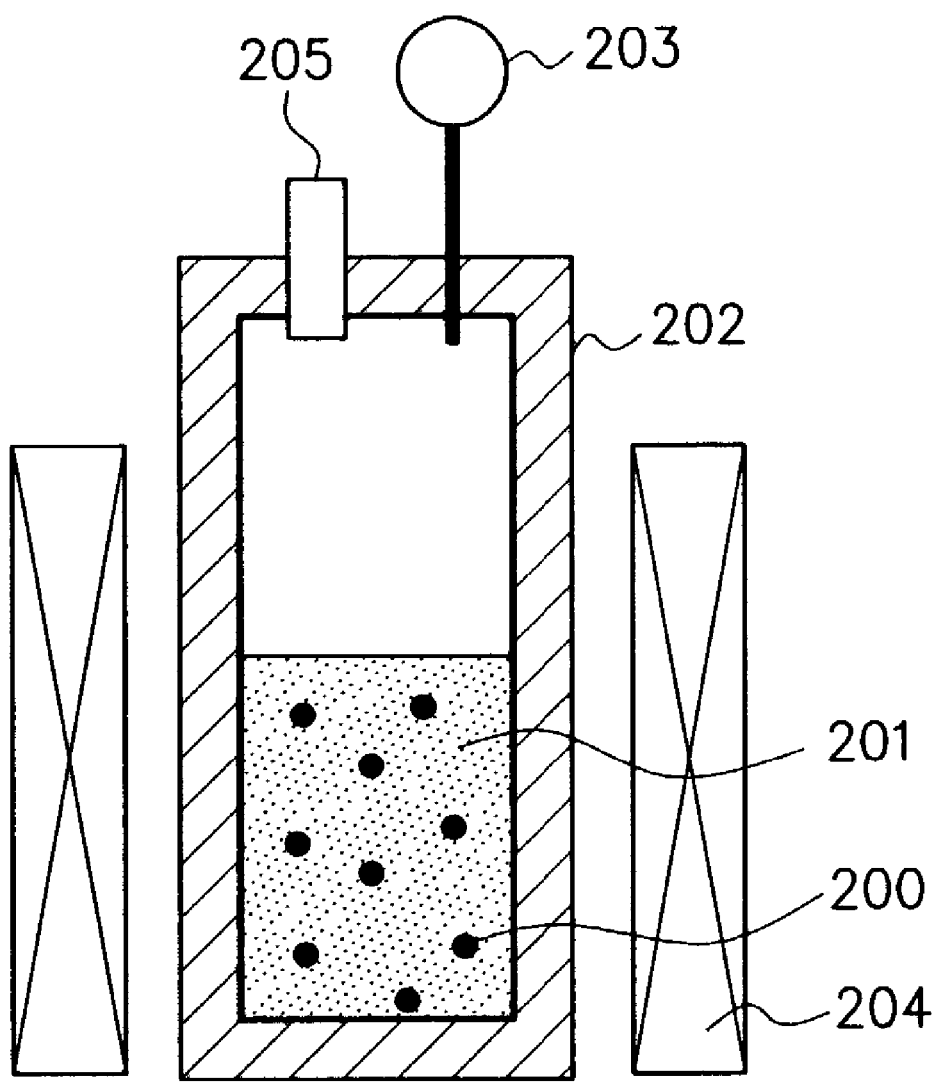
FIG. 2 is a schematic cross-sectional view illustrating an example of a reaction apparatus used for practicing the fullerenes-producing method of the present invention.

FIG. 1 shows a flow chart illustrating an example of the above-described fullerene-producing method of the present invention. FIG. 2 is a schematic cross-sectional view illustrating an example of a reaction apparatus used for practicing the fullerenes-producing method of the present invention.

Description will be made with reference to FIG. 1.

In Step 1, an aromatic compound-containing starting material and a reaction medium-forming material, and if necessary, a transition metal or/and a transition metal compound are introduced into a substantially enclosed reaction vessel of a reaction apparatus.

In Step 2, the materials introduced in the reaction vessel are together heated while being compressed, where preferably, the reaction medium-forming material is converted into a supercritical fluid and the starting material is contacted with the supercritical fluid to obtain a reaction product containing fullerenes.

In Step 3, if required, the reaction product is subjected to a heat treatment at a temperature of 300 to 600° C. preferably in an inert gas atmosphere in order to remove impurities contained in the reaction product.

In Step 4, the heat-treated reaction product is subjected to an extraction treatment using a solvent capable of dissolving fullerenes to extract a dissoluble component containing fullerenes and the solvent contained in the extracted dissoluble component is removed.

The reaction apparatus shown in FIG. 2 comprises a substantially enclosed pressure reaction vessel 202 provided with a pressure gauge 203, a heater 204, and a safety vent 205. At least the inner wall of the reaction vessel 202 is made of preferably a stainless steel or more preferably a Ni—Mo alloy so as to have sufficient corrosion resistance.

Reference numeral 201 indicates a reaction medium-forming material contained in the reaction vessel 202, and reference numeral 200 indicates an aromatic compound-containing starting material mixed in the reaction medium-forming material 201 in the reaction vessel.

Although not shown in FIG. 2, it is preferred that the reaction apparatus is provided with an agitation mechanism in order to uniformly promote the reaction in the reaction vessel. Further, although not shown in FIG. 2, the reaction apparatus is preferred to have a circulating flow reaction system in that from the reaction product containing the unreacted starting material outputted from the reaction vessel, a fullerenes-containing reaction product is isolated and the unreacted starting material is returned into the reaction vessel, in order to improve the yield from the starting material.

By the way, a fullerene comprising carbon atoms only has a three-dimensional closed spherical molecular structure comprising a plurality of five-member rings of carbon atoms and a plurality of six-member rings of carbon atoms. Of the fullerene, when the number of the vertices of the polyhedron comprising carbon atoms is made to be V, the number of the edges of the polyhedron is made to be E, and the number of the faces of the polyhedron is made to be F, the relationships of $E+2=V+F$ and $2E=3V$ in the Euler's theorem are established.

The fullerenes produced in the present invention have such three-dimensional closed spherical molecular structure. Specifically, they include fullerene $C_{60}$ with 60 carbon atoms, fullerene $C_{70}$ with 70 carbon atoms, fullerene $C_{76}$ with 76 carbon atoms, fullerene $C_{78}$ with 78 carbon atoms, fullerene $C_{82}$ with 82 carbon atoms, fullerene $C_{84}$ with 84 carbon atoms, fullerene $C_{86}$ with 86 carbon atoms, fullerene $C_{88}$ with 88 carbon atoms, fullerene $C_{90}$ with 90 carbon atoms, fullerene $C_{94}$ with 94 carbon atoms, and fullerene $C_{96}$ with 96 carbon atoms.

The fullerene can be determined by laser-vaporization cluster beam mass spectrum, infrared absorption spectrum analysis, Raman scattering spectrum analysis, $^{13}$C-NMR spectrum analysis, electron diffraction analysis, X-ray diffraction analysis, or neutron diffraction analysis.

In the following, the present invention will be described in more detail with reference to examples. It should be understood that these examples are only for illustrative purposes and the scope of the present invention is not restricted by these examples.

EXAMPLE 1

Into the reaction vessel 202 (made of a Ni—Mo alloy) of the reaction apparatus shown in FIG. 2, 2 g of naphthalene (the critical temperature: 475° C.; the critical pressure: 4.11 MPa) as the starting material 200, 0.2 g of ferric chloride ($FeCl_3$) as a catalyst, 2 g of ethanol (the critical temperature: 243° C.; the critical pressure: 6.38 MPa) as a solvent for said ferric chloride, and 80 g of a dryice $CO_2$ (the critical temperature: 31° C.; the critical pressure: 7.38 MPa) as the reaction medium-forming material 201 were introduced, and they were subjected to reaction at 300° C. under pressure condition of 12 MPa for 6 hours to obtain a reaction product. The resultant reaction product was subjected to an extraction treatment with toluene to obtain an extracted reaction product.

A sample of the extracted reaction product was diluted with toluene to 200 times to obtain a toluene solution. The toluene solution was subjected to analysis by a high performance liquid chromatography with the use of an eluting solution comprising methanol/toluene=51/41. As a result, there were observed a peak corresponding to unreacted naphthalene and a peak at a position in agreement with the retention time previously measured by a fullerene $C_{60}$ toluene solution.

Another sample of the extracted reaction product was subjected to isolation and purification by a high performance liquid chromatography using a ODS (octadecyksilicas) column to obtain a purified product. The purified product was subjected to analysis by a laser desorption time-of-flight mass spectrum analyzer. There was observed a spectrum corresponding to more than $C_{60}$ (60 carbon atoms). Besides, the purified product was subjected to analysis by an infrared spectroscopy. As a result, there was observed an absorption peak at 1180 $cm^{-1}$ which is peculiar to fullerene.

EXAMPLE 2

The procedures of Example 1 were repeated, except that 0.2 g of ferrocene was added in addition to the ferric chloride as the catalyst, to obtain a reaction product. The reaction product was subjected to an extraction treatment with toluene to obtain an extracted reaction product.

As well as in Example 1, a sample of the extracted reaction product was subjected to analysis by the high performance liquid chromatography. As a result, there were observed a peak corresponding to unreacted naphthalene and a peak at a position in agreement with the retention time previously measured by a fullerene $C_{60}$ toluene solution.

EXAMPLE 3

The procedures of Example 1 were repeated, except that the ferric chloride was not used and the reaction temperature was changed to 400° C., to obtain a reaction product. The reaction product was subjected to an extraction treatment with toluene to obtain an extracted reaction product.

As well as in Example 1, a sample of the extracted reaction product was subjected to analysis by the high performance liquid chromatography. As a result, there were observed a peak corresponding to unreacted naphthalene and a peak at a position in agreement with the retention time previously measured by a fullerene $C_{60}$ toluene solution.

EXAMPLE 4

The procedures of Example 1 were repeated, except that the ferric chloride was not added, 22 g of ion-exchanged water was added instead of the dryice, the reaction temperature was changed to 400° C., and the pressure was changed to 28 MPa, to obtain a reaction product. The reaction product was subjected to an extraction treatment with toluene to obtain an extracted reaction product.

As well as in Example 1, a sample of the extracted reaction product was subjected to analysis by the high performance liquid chromatography. As a result, there were observed a peak corresponding to unreacted naphthalene and a peak at a position in agreement with the retention time previously measured by a fullerene $C_{60}$ toluene solution.

EXAMPLE 5

The procedures of Example 1 were repeated, except that toluene was used instead of the naphthalene as the starting material, the ferric chloride was not used, and the reaction temperature was changed to 400° C., to obtain a reaction product. The reaction product was subjected to an extraction treatment with toluene to obtain an extracted reaction product.

As well as in Example 1, a sample of the extracted reaction product was subjected to analysis by the high performance liquid chromatography. As a result, there were observed a peak corresponding to unreacted naphthalene and a peak at a position in agreement with the retention time previously measured by a fullerene $C_{60}$ toluene solution.

EXAMPLE 6

The procedures of Example 1 were repeated, except that 2.5 g of pitch was used instead of the naphthalene as the starting material, the ferric chloride was not used and the reaction temperature was changed to 400° C., to obtain a reaction product. The reaction product was subjected to a heat treatment in an argon atmosphere at 400° C. for 3 hours. The heat-treated reaction product was subjected to an extraction treatment with toluene to obtain an extracted reaction product.

As well as in Example 1, a sample of the extracted reaction product was subjected to analysis by the high performance liquid chromatography. As a result, there were observed a peak corresponding to unreacted pitch and a peak at a position in agreement with the retention time previously measured by a fullerene $C_{60}$ toluene solution.

EXAMPLE 7

The procedures of Example 1 were repeated, except that 2 g of 5,8-dihydroxy-1,4-naphthoquinone was used instead of the naphthalene as the starting material, sulfuric acid was used instead of the ferric chloride as the catalyst, and the reaction temperature was changed to 400° C., to obtain a reaction product. The reaction product was subjected to an extraction treatment with toluene to obtain an extracted reaction product.

As well as in Example 1, a sample of the extracted reaction product was subjected to analysis by the high performance liquid chromatography. As a result, there were observed a peak corresponding to unreacted 5,8-dihydroxy-1,4-naphthoquinone and a peak at a position in agreement with the retention time previously measured by a fullerene $C_{60}$ toluene solution.

COMPARATIVE EXAMPLE 1

The procedures of Example 1 were repeated, except that the naphthalene as the starting material was omitted, to obtain a reaction product.

The reaction product was subjected to an extraction treatment with toluene to obtain an extracted reaction product.

As well as in Example 1, a sample of the extracted reaction product was subjected to analysis by the high performance liquid chromatography. As a result, there was not observed a peak at a position in agreement with the retention time previously measured by a fullerene $C_{60}$ toluene solution.

From this, it is understood that the ethanol used as the solvent for the ferric chloride cannot serve as the starting material.

COMPARATIVE EXAMPLE 2

The procedures of Example 1 were repeated, except that the reaction temperature was changed to 600° C., to obtain a reaction product. The reaction product was subjected to an extraction treatment with toluene to obtain an extracted reaction product.

As well as in Example 1, a sample of the extracted reaction product was subjected to analysis by the high performance liquid chromatography. As a result, there was not observed a peak at a position in agreement with the retention time previously measured by a fullerene $C_{60}$ toluene solution.

COMPARATIVE EXAMPLE 3

The procedures of Example 1 were repeated, except that the reaction temperature was changed to 30° C., to obtain a reaction product. The reaction product was subjected to an extraction treatment with toluene to obtain an extracted reaction product.

As well as in Example 1, a sample of the extracted reaction product was subjected to analysis by the high performance liquid chromatography. As a result, there was not observed a peak at a position in agreement with the retention time previously measured by a fullerene $C_{60}$ toluene solution.

As above described, according to the present invention, it is possible to effectively produce fullerenes from a relatively inexpensive starting material by a simple manner using a relatively inexpensive reaction apparatus without necessity of using a costly vacuum reaction apparatus. In addition, the fullerene-producing method of the present invention can be practiced in a large-scaled reaction apparatus so as to mass-produce fullerenes.

What is claimed is:

1. A method for producing fullerenes, characterized in that said method includes a step (a) of contacting an aromatic compound-containing starting material with a supercritical fluid or a subcritical fluid at a temperature in a range of from 31° C. to 500° C. and at a pressure in a range of from 3.8 MPa to 60 MPa.

2. The method according to claim 1, wherein said supercritical fluid or said subcritical fluid is formed from one or more kinds of materials selected from the group consisting of an aromatic compound as said starting material, a solvent for said aromatic compound, water, dinitrogen monoxide, and ammonia.

3. The method according to claim 2, wherein said solvent is one or more kinds of materials selected from the group consisting of carbon dioxide, alcohols, hydrocarbons, and ethers.

4. The method according to claim 1, wherein said method includes a step (b) of subjecting a reaction product obtained in said step (a) to a heat treatment at a temperature in a range of from 300 to 600° C.

5. The method according to claim 4, wherein said heat treatment in said step (b) is conducted in a gas atmosphere composed of one or more gases selected from the group consisting of argon gas, helium gas and nitrogen gas.

6. The method according claim 4 or 5, wherein said method includes a step (c) in that a dissoluble component contained in a heat-treated reaction product obtained in said step (b) which is dissoluble in a solvent for fullerenes is extracted with said solvent.

7. The method according to claim 6, wherein said solvent is a nonpolar solvent comprising one or more solvents selected from the group consisting of toluene, xylene, benzene, chlorobenzene, dichlorobenzene, 1,2,4-trichlorobenzene, 1-methylnaphthalene, 1-chloronaphthalene, tetralin, anisole, 1,1,2,2-tetrachloroethane, decalin, 2-methylthiophene, carbon disulfide, and cyclohexene.

8. The method according claim 1, wherein said aromatic compound-containing starting material comprises at least one kind of material selected from the group consisting of benzene, toluene, xylene, pitch, pitch coke, petroleum coke, coal tar, fluoranthene, pyrene, chrysene, phenanthrene, anthracene, naphthalene, methylnaphthalene, fluorene, biphenyl, and acenaphthene.

9. The method according to claim 1, wherein to contact said aromatic compound-containing starting material with said supercritical fluid or said subcritical fluid in said step (a) is conducted under pressure condition of 2 to 60 MPa.

10. The method according claim 1 or 9, wherein contact said aromatic compound-containing starting material with said supercritical fluid or said subcritical fluid in said step (a) is performed in the presence of an transition metal or/and a transition metal compound.

11. The method according to claim 10, wherein said transition metal compound comprises one or more transition compounds selected from the group consisting of transition metal halides, transition metal sulfides, transition metal carbides, organo transition metal compounds, transition metal nitrides, and transition metal oxides.

12. The method according to claim 10, wherein the transition metal element constituting said transition metal or said transition metal compound is at least one kind of metal element selected from the group consisting of Ti, Cr, Fe, Co, Ni, Cu, Mo, and W.

13. The method according to claim 10, wherein said transition metal compound comprises one or more organo transition metal compounds selected from the group consisting of ferrocene, nickelocene, nickel phthalocyanine, cobalt phthalocyanine, copper phthalocyanine, nickel acetylacetonato, cobalt acetylacetonato, iron acetylacetonato, copper acetylacetonato, nickel carbonyl, cobalt carbonyl, iron carbonyl, bis(triphenylphosphine)dicarbonylnickel, dibromobis(triphenylphosphine)nickel, and chlorotris(triphenylphosphine)rhodium.

14. The method according to claim 1, wherein fullerenes contained in a reaction product obtained in said step (a) contain a magnetic metal therein.

15. The method according to claim 14, wherein said method includes a purification step in that said fullerenes contained in said reaction product are collected by virtue of magnetic force to obtain a product comprising purified fullerenes.

* * * * *

UNITED STATES PATENT AND TRADEMARK OFFICE
CERTIFICATE OF CORRECTION

PATENT NO. : 6,953,564 B2
APPLICATION NO. : 10/260556
DATED : October 11, 2005
INVENTOR(S) : Soichiro Kawakami et al.

It is certified that error appears in the above-identified patent and that said Letters Patent is hereby corrected as shown below:

ON COVER PAGE AT (56) U.S. PATENT DOCUMENTS

U.S. Patent Appl. No. 10/807,104, filed March 24, 2004, Kawakami et al." should be deleted.

COLUMN 1

Line 26, "carrying" should read --carried--;
Line 39, "extracted from" (second occurrence) should be deleted--; and
Line 40, "a" should be deleted--.

COLUMN 3

Line 62, "being" should read --is--.

COLUMN 5

Line 20, "comprises" should read --comprise--.

COLUMN 6

Line 25, "combination two" should read --combination of two--.

UNITED STATES PATENT AND TRADEMARK OFFICE
CERTIFICATE OF CORRECTION

PATENT NO. : 6,953,564 B2
APPLICATION NO. : 10/260556
DATED : October 11, 2005
INVENTOR(S) : Soichiro Kawakami et al.

It is certified that error appears in the above-identified patent and that said Letters Patent is hereby corrected as shown below:

COLUMN 7

Line 38, "contain" should read --contains--.

COLUMN 9

Line 9, "dryice" should read --dry ice--.

COLUMN 10

Line 5, "dryice," should read --dry ice,--.

COLUMN 12

Line 28, "to contact" should read --contact of--;
Line 32, "contact" should read --contact of--; and
Line 35, "an" should read --a--.

Signed and Sealed this

Twelfth Day of September, 2006

JON W. DUDAS
*Director of the United States Patent and Trademark Office*